(12) United States Patent
Forsberg et al.

(10) Patent No.: US 7,813,505 B2
(45) Date of Patent: Oct. 12, 2010

(54) SEQUENCE NUMBER SYNCHRONIZATION FOR CIPHERING

(75) Inventors: Dan Forsberg, Helsinki (FI); Timo M. Rantalainen, Helsinki (FI); Haitao Tang, Helsinki (FI)

(73) Assignee: Nokia Corporation, Espoo (FI)

( * ) Notice: Subject to any disclaimer, the term of this patent is extended or adjusted under 35 U.S.C. 154(b) by 566 days.

(21) Appl. No.: 11/591,483

(22) Filed: Nov. 2, 2006

(65) Prior Publication Data

US 2008/0002594 A1 Jan. 3, 2008

(30) Foreign Application Priority Data

Jun. 28, 2006 (EP) .................................. 06116244

(51) Int. Cl.
*H04N 7/167* (2006.01)
(52) U.S. Cl. ..................................... 380/225
(58) Field of Classification Search .................. None
See application file for complete search history.

(56) References Cited

U.S. PATENT DOCUMENTS

| | | | | |
|---|---|---|---|---|
| 6,011,796 | A * | 1/2000 | Rezaiifar et al. | 370/394 |
| 6,909,887 | B2 * | 6/2005 | Fauconnier et al. | 455/403 |
| 7,009,940 | B2 * | 3/2006 | Vialen et al. | 370/252 |
| 2002/0035682 | A1 * | 3/2002 | Niemi et al. | 713/151 |
| 2002/0164029 | A1 | 11/2002 | Jiang | 380/270 |
| 2003/0031322 | A1 * | 2/2003 | Beckmann et al. | 380/278 |
| 2003/0044011 | A1 * | 3/2003 | Vialen et al. | 380/201 |
| 2003/0067921 | A1 * | 4/2003 | Sivalingham | 370/394 |
| 2003/0169882 | A1 * | 9/2003 | Rose | 380/270 |
| 2004/0093494 | A1 * | 5/2004 | Nishimoto et al. | 713/165 |
| 2004/0205332 | A1 * | 10/2004 | Bouchard et al. | 713/153 |
| 2004/0213297 | A1 * | 10/2004 | Isokangas et al. | 370/535 |
| 2006/0056625 | A1 * | 3/2006 | Nakabayashi et al. | 380/46 |
| 2006/0072477 | A1 * | 4/2006 | Bodlaender | 370/254 |
| 2006/0133262 | A1 * | 6/2006 | Sutivong et al. | 370/209 |
| 2006/0203823 | A1 * | 9/2006 | Jiang | 370/394 |
| 2007/0112603 | A1 * | 5/2007 | Kauthen et al. | 705/3 |
| 2007/0116282 | A1 * | 5/2007 | Hawkes et al. | 380/239 |
| 2008/0002594 | A1 * | 1/2008 | Forsberg et al. | 370/252 |
| 2008/0170701 | A1 * | 7/2008 | Matsuo et al. | 380/281 |
| 2008/0292101 | A1 * | 11/2008 | Macchi | 380/270 |

FOREIGN PATENT DOCUMENTS

| | | |
|---|---|---|
| EP | 1432271 A2 | 6/2004 |
| EP | 1622331 B1 | 2/2006 |

* cited by examiner

*Primary Examiner*—Chi H Pham
*Assistant Examiner*—Fan Ng
(74) *Attorney, Agent, or Firm*—Harrington & Smith

(57) ABSTRACT

Sequence numbers for data packets to be transmitted using bearers having bearer identifiers in a communications system are generated, wherein the sequence numbers are generated independently for each of the bearers used for transmitting the data packets. Last generated sequence numbers for each of the bearers identifiers are stored and held in a memory. When a sequence number for a data packet to be transmitted using a bearer out of the bearers which has been used before is to be generated the memory is checked on a last generated sequence number for the bearer with a previously used bearer identifier and the sequence number is generated in accordance therewith.

19 Claims, 3 Drawing Sheets

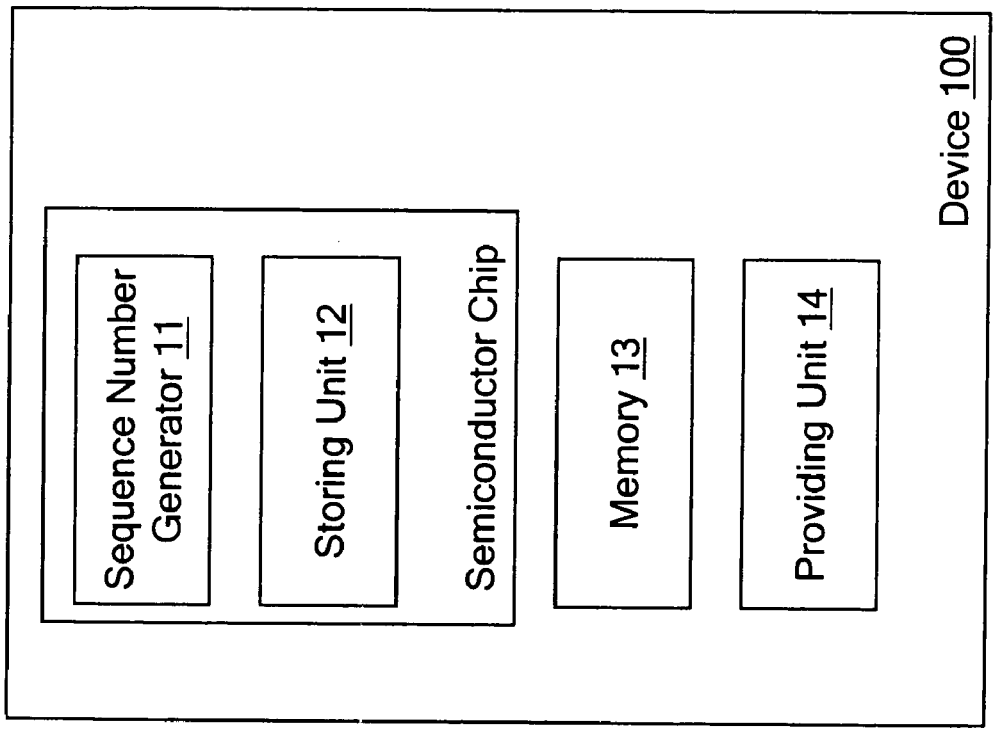

SEQUENCE NUMBER SYNCHRONIZATION FOR CIPHERING

TECHNICAL FIELD

The present invention relates to sequence number synchronization for ciphering. The invention can be applied in the field of user/control plane ciphering and PDCP (Packet Data Convergence Protocol) in 3GPP SAE/LTE (Third Generation Partnership Project System Architecture Evolution/Long Term Evolution).

BACKGROUND

For a ciphering function it is generally required that the same input parameters must not be used twice. In other words, with same ciphering key, the combination of input parameters including a sequence number must be different for every encrypted/decrypted user plane packet.

In RRC (Radio Resource Control) protocol in UTRAN (UMTS (Universal Mobile Telecommunications System) Terrestrial Radio Access Network), a UE (User Equipment) provides a START value indicating the next number in a sequence to a target NodeB (NodeB is UTRAN base station) during handover. Thus, the sequence number is continuously used with every NodeB where the same keys are used. Therefore, the sequence number does not start from 0 in every handover. The mechanism to keep the sequence number synchronized is that the UE sends the START value which is the next number in the sequence. Hence, UE and target NodeB synchronize packet sequence numbers in handover.

In 3GPP LTE it has been decided that user plane packet sequence number is per bearer. If bearers are frequently created and destroyed, e.g. a new bearer is created/destroyed for every call, it is very likely that the same bearer will be used with the same ciphering key. The invention has been designed to overcome the above problems and to avoid frequent ciphering key re-negotiation for user plane stack.

SUMMARY

According to the invention, sequence numbers for data packets to be transmitted using bearers having bearer identifiers in a communications system are generated, wherein the sequence numbers are generated independently for each of the bearers used for transmitting the data packets. Last generated sequence numbers for each of the bearers identifiers are stored and held in a memory. When a sequence number for a data packet to be transmitted using a bearer out of the bearers which has been used before is to be generated the memory is checked on a last generated sequence number for the bearer with a previously used bearer identifier and the sequence number is generated in accordance therewith.

With the invention it is not required to change a ciphering key for a user plane whenever all bearer IDs have been consumed. There is also no need to increase bits for the bearer ID and thus break backwards compatibility with existing Kasumi hardware. According to a preferred embodiment of the invention there is also no need to transfer a START value to an end point.

BRIEF DESCRIPTION OF THE DRAWINGS

In the following the invention will be described by way of preferred embodiments thereof with reference to the accompanying drawings, in which:

FIG. 3 shows a schematic block diagram illustrating a device for managing sequence numbers with ciphering and different bearers according to an embodiment of the invention.

DETAILED DESCRIPTION

In 3GPP LTE it has been decided that a user plane packet sequence number is per bearer. A bearer is identified using a bearer ID. Kasumi cipher suite ciphering function requires a bearer ID, ciphering key, direction, and sequence number as input parameters as shown in FIG. 1.

Figure 1:
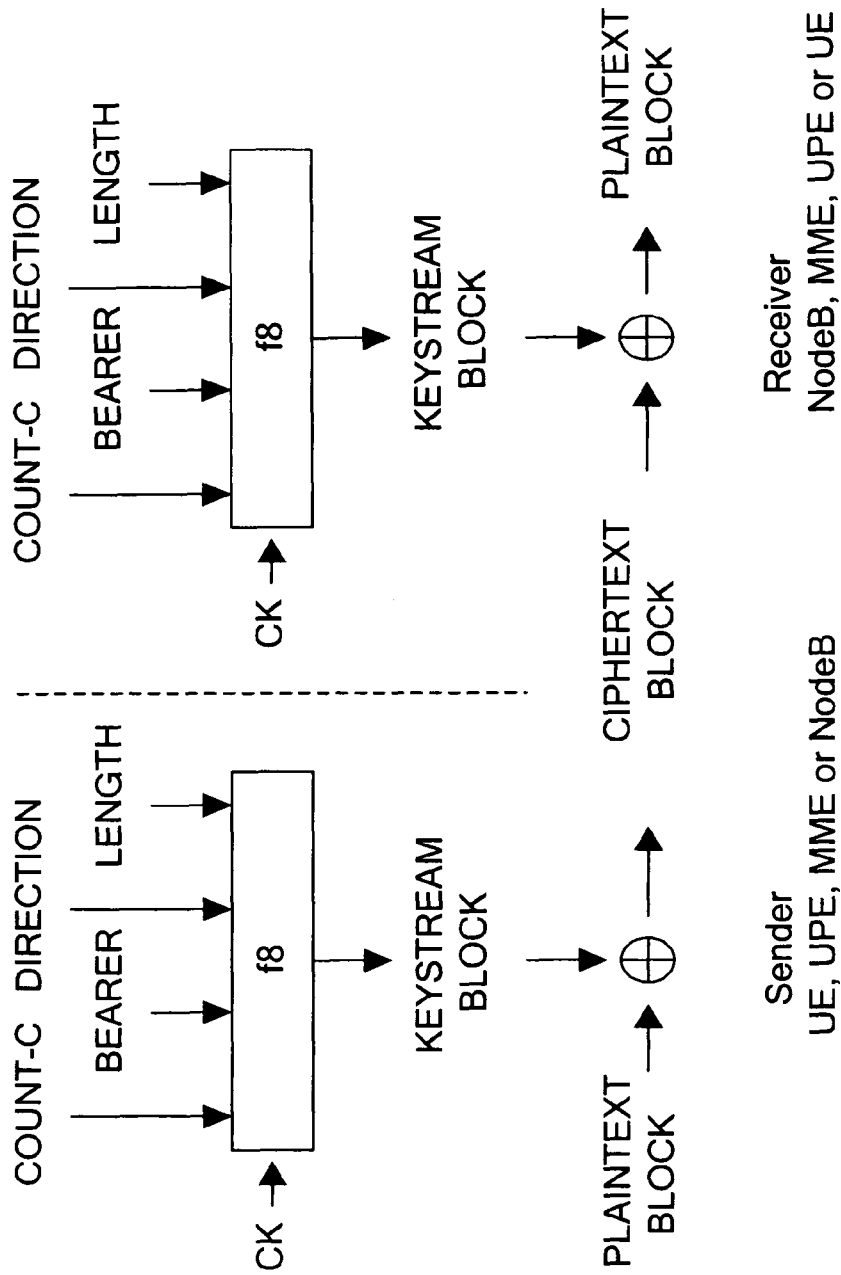
FIG. 1 shows a schematic block diagram illustrating ciphering of user and signalling data transmitted over a radio access link.

FIG. 1 illustrates use of a ciphering algorithm f8 to encrypt plaintext by applying a keystream using a bit per bit binary addition of the plaintext and the keystream in a sender which may be a UE, UPE (User Plane Entity), MME (Mobility Management Entity), or NodeB. The plaintext may be recovered by generating the same keystream using the same input parameters and applying a bit per bit binary addition with the ciphertext in a receiver which may be a UE, UPE, MME, or NodeB. The input parameters to the algorithm are a ciphering key CK, a time dependent input COUNT-C, a bearer identity BEARER, a direction of transmission DIRECTION and length of the keystream required LENGTH. Based on these input parameters the algorithm generates the output keystream block KEYSTREAM which is used to encrypt the input plaintext block PLAINTEXT to produce the output ciphertext block CIPHERTEXT.

The time dependent input COUNT-C is a ciphering sequence number or user plane packet sequence number.

For the ciphering function it is generally required that the same input parameters must not be used twice. Thus, with the same ciphering key which may be 128 bits long, the combination of direction (e.g. 1 bit), sequence number (e.g. 32 bits) and bearer ID (e.g. 5 bits) must be different for every encrypted/decrypted user plane packet.

In Kasumi the bearer ID is 5 bits long which means a numerical range from 0 to 31. If bearers are frequently created and destroyed, e.g. a new bearer for every call, it is very likely that the same bearer ID will be used with the same ciphering key. Thus, the sequence number has to be different each time the same bearer ID is used. Otherwise, the ciphering key has to be changed every time a bearer ID number is to be re-used, which would be rather frequently.

In order to assure that same input parameters of a ciphering function are not used twice an approach would be to change ciphering keys when all available bearer IDs have been consumed and start sequence numbers from 0 for each established bearer. Alternatively, the bits for the bearer ID could be increased. This, however, would break backwards compatibility with Kasumi ciphering suite.

Figure 2:
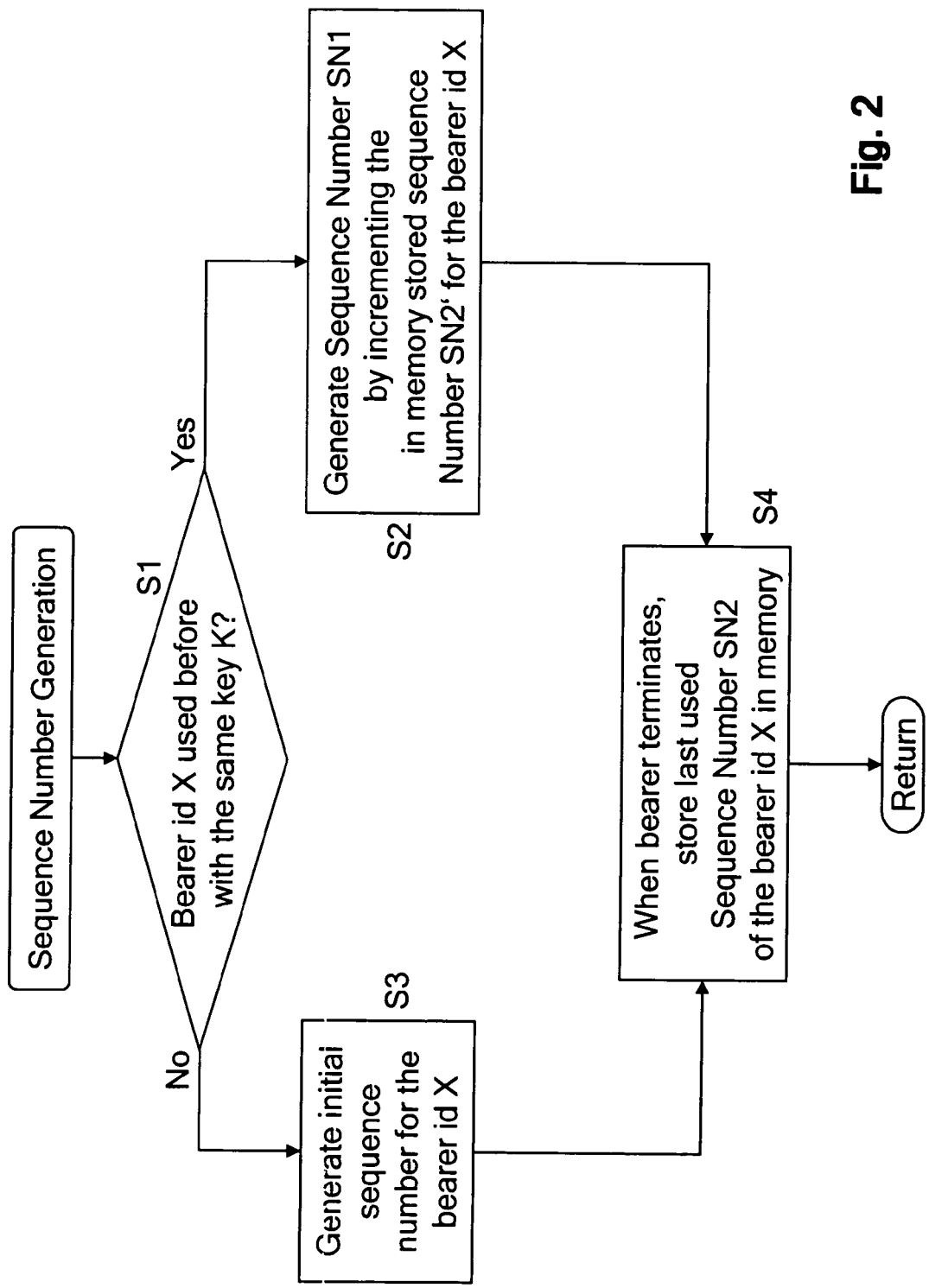
FIG. 2 shows a flow chart illustrating a method of managing sequence numbers with ciphering and different bearers according to an embodiment of the invention.

FIG. 2 shows a flow chart illustrating a method of managing sequence numbers with ciphering and different bearers according to an embodiment of the invention.

According to the method shown in FIG. 2, sequence numbers are generated for data packets to be transmitted using bearers having bearer identifiers in a communications system, wherein the sequence numbers are generated independently for each of the bearers used for transmitting the data packets. In step Si, when a sequence number for a data packet is to be generated it is determined whether a bearer ID which has been used before is to be used for transmitting the data packet. In other words, in step S1 it is checked whether a bearer ID X has been used before with the same ciphering key K.

If YES in step S, in step S2 a sequence number SN1 for the data packet is generated e.g. by incrementing a sequence number SN2' stored in memory for the bearer ID X. While the bearer with ID X is active (in use), the sequence number is increased and kept in memory as a state information for the bearer.

In step S4, when the bearer with ID X terminates, a last used/generated sequence number SN2 of the bearer ID X is stored and held in the memory.

For example, in step S2, if the last generated sequence number retrieved from the memory for bearer ID X is 4, the generated sequence number for the current data packet is 5 assuming an increment of 1.

If NO in step S1, in step S3 an initial sequence number is generated for bearer ID X. The initial sequence number may be chosen randomly.

In step S4, when the bearer with ID X terminates, a last used sequence number SN2 of the bearer ID X is stored and held in the memory.

Thus, according to the invention, the last used sequence number SN2 of bearer X is stored into the memory. When the bearer X is used again, a sequence number SN2+Y (with Y normally being 1) can be used for transmitting a current data packet.

Moreover, it may be checked whether a receiver which is to receive the current data packet also has a functionality of storing last generated sequence numbers for bearers. If not, the initial sequence number generated for the current data packet based on the last generated sequence number may be transmitted to the receiver as a start value during establishment of the new bearer. For example, if a UPE (User Plane Entity) stores the last used sequence number into the memory and a UE (User Equipment) does not do that, then the UPE can send the sequence number for the UE.

The data packets may be control plane data packets and/or user plane data packets and a User Plane Entity (UPE) according to 3GPP SAE/LTE (3GPP System Architecture Evolution/Long Term Evolution) may be configured to perform the above-described method. UPE is a logical entity, but is assumed to be located in the core network side (e.g. a user plane gateway). Locating UPE with evolved NodeB in the same physical node may also be possible. In addition, an MME may be configured to perform the above-described method. MME is a logical entity in SAE/LTE corresponding to a Serving GPRS Support Node in GPRS. Also a user equipment and/or a base station may be configured to perform the above-described method.

The above described method may also be implemented as computer program product.

FIG. 3 shows a schematic block diagram illustrating a device 100 for managing sequence numbers with ciphering and different bearers according to an embodiment of the invention.

The device 100 comprises a sequence number generator 11 and a storing unit 12. The device may further comprise a memory 13 and a providing unit 14. Alternatively, the memory 13 may be located outside the device 100. The generator 11 and the storing unit 12 may be integrated as circuitries on a semiconductor chip. The semiconductor chip may further comprise the memory 13 and the providing unit 14.

The sequence number generator 11 generates sequence numbers for data packets to be transmitted using bearers having bearer identifiers in a communications system. The sequence number generator generates the sequence numbers independently for each of the bearers used for transmitting the data packets. The storing unit 12 stores and holds last generated sequence numbers for each of the bearers identifiers in the memory 13. When a sequence number for a data packet to be transmitted using a bearer out of the bearers which has been used before is to be generated by the generator 11 the storing unit 12 checks the memory 13 on a last generated sequence number for the bearer with a previously used bearer identifier and the generator 11 generates the sequence number in accordance with a check result provided by the storing unit 12.

The providing unit 14 may provide the sequence number to a receiver, which is to receive the data packet, during establishment of the bearer.

Moreover, the storing unit 12 may store a last generated sequence number for a bearer in the memory when the bearer terminates.

The device 100 may be implemented in a user equipment for use in a communications system and/or in a base station for use in the communications system. The device 100 may also be implemented in a UPE and/or an MME.

It is to be noted that the device 100 shown in FIG. 3 may have further functionality for working e.g. in a user equipment, base station or User Plane Entity. Here the functions of the device 100 relevant for understanding the principles of the invention are described using functional blocks as shown in FIG. 3. The arrangement of the functional blocks of the device 100 is not construed to limit the invention, and the functions may be performed by one block or further split into sub-blocks.

As described above, UE and UPE are able to keep the last used sequence number for each bearer (e.g. 32 bearers) in memory. Thus, when the same bearer ID is used again, both UE and UPE know the next usable sequence number for that bearer, i.e. a START value, without negotiation. With 32 bearers and a ciphering sequence number of 32 bits, state information is required in the end points of at maximum 32*32 bits=128 bytes.

According to a further embodiment, only one of the end points keeps the last used sequence numbers in memory and provides the value to the other end point(s) during bearer establishment. This however, requires signalling and carrying the START value.

In an additional exemplary embodiment in accordance with this invention, there is provided a computer program product embodied on a computer readable medium. The computer program product is configured to control a processor to conduct a method. The method comprising: generating sequence numbers for data packets to be transmitted using bearers having bearer identifiers in a communications system, wherein the sequence numbers are generated independently for each of the bearers used for transmitting the data packets; and storing and holding last generated sequence numbers for each of the bearer identifiers in a memory, wherein when a sequence number for a data packet to be transmitted using a bearer out of the bearers which has been used before is to be generated, the memory is checked on a last generated sequence number for the bearer with a previously used bearer identifier, and the sequence number is generated in accordance therewith.

It is to be understood that the above description is illustrative of the invention and is not to be construed as limiting the invention. Various modifications and applications may occur to those skilled in the art without departing from the true spirit and scope of the invention as defined by the appended claims.

The invention claimed:

1. A method comprising:
   generating, by a processor, sequence numbers for data packets to be transmitted using bearers having bearer identifiers in a communications system, wherein the sequence numbers are generated independently for each of the bearers used to transmit the data packets; and
   storing and holding, by a memory, last generated sequence numbers for each of the bearer identifiers,
   wherein when a starting sequence number for data packets to be transmitted using a bearer out of the bearers which has been used before with a current ciphering key is to be generated, a last generated sequence number for the bearer is determined, where the bearer has a previously used bearer identifier, and the starting sequence number for the data packets is generated in accordance therewith.

2. The method of claim 1, comprising: providing the starting sequence number to a receiver, which is to receive the data packets, during establishment of the bearer.

3. The method of claim 1, wherein a last generated sequence number for the bearer is stored in the memory when the bearer terminates.

4. The method of claim 1, wherein the data packets are user plane data packets or control plane packets.

5. The method of claim 1, wherein the bearer identifier is five bits long.

6. An apparatus, comprising:
   a processor; and
   a memory including computer program code,
   the memory and the computer program code configured to, with the processor, cause the apparatus at least to:
   generate sequence numbers for data packets to be transmitted using bearers having bearer identifiers in a communications system, wherein the sequence numbers are generated independently for each of the bearers used to transmit the data packets; and
   store and hold last generated sequence numbers for each of the bearer identifiers in the memory,
   wherein when a starting sequence number for data packets to be transmitted using a bearer out of the bearers which has been used before with a current ciphering key is to be generated, a last generated sequence number for the bearer is determined, where the bearer has a previously used bearer identifier, and the starting sequence number for the data packets is generated in accordance therewith.

7. The apparatus of claim 6 wherein the starting sequence number for the data packets is generated in accordance with a check result provided by the memory.

8. The apparatus of claim 6, wherein the memory and the computer program code are configured to, with the processor, cause the apparatus at least to provide the starting sequence number to a receiver, which is to receive the data packets, during establishment of the bearer.

9. The apparatus of claim 6, wherein the memory and the computer program code are configured to, with the processor, cause the apparatus at least to store a last generated sequence number for a bearer in the memory when the bearer terminates.

10. The apparatus of claim 6, comprising at least one of a user plane entity, a mobility management entity, a user equipment and a base station.

11. The apparatus of claim 6, wherein the apparatus is caused at least to generate the sequence of numbers independently for each of the bearers used to transmit user plane data packets or control plane packets.

12. The apparatus of claim 6, wherein the data packets are user plane data packets or control plane packets.

13. A non-transitory computer-readable medium encoded with instructions configured to control a processor to perform a process, the process comprising:
   generating sequence numbers for data packets to be transmitted using bearers having bearer identifiers in a communications system, wherein the sequence numbers are generated independently for each of the bearers used to transmit the data packets; and
   storing and holding last generated sequence numbers for each of the bearer identifiers in a memory, wherein when a starting sequence number for data packets to be transmitted using a bearer out of the bearers which has been used before with a current ciphering key is to be generated, a last generated sequence number for the bearer is determined, where the bearer has a previously used bearer identifier, and the starting sequence number for the data packets is generated in accordance therewith.

14. The non-transitory computer-readable storage memory according to claim 13, wherein a last generated sequence number for a bearer is stored in the memory when the bearer terminates, and wherein the transmitted data packets are user plane data packets or control plane packets.

15. The non-transitory computer-readable medium according to claim 13, wherein the instructions are directly loadable into an internal memory of the processor.

16. An apparatus, comprising:
   generating means for generating sequence numbers for data packets to be transmitted using bearers having bearer identifiers in a communications system, wherein the generating means are configured to generate the sequence numbers independently for each of the bearers used for transmitting the data packets; and
   storing means for storing and holding last generated sequence numbers for each of the bearers identifiers in a memory,
   wherein when a starting sequence number for a data packets to be transmitted using a bearer out of the bearers which has been used before with a current ciphering key is to be generated by the generating means, the storing means are configured to determine a last generated sequence number for the bearer, where the bearer has a previously used bearer identifier and the generating means are configured to generate the starting sequence number for the data packets in accordance with a check result provided by the storing means.

17. A method comprising:
   determining, by a processor, whether a bearer identifier for a new bearer transmission has been used previously with a current ciphering key in a previous bearer transmission;
   in response to determining that the bearer identifier has been used previously with a current ciphering key, retrieving, from a memory, a last used sequence number for the previous bearer transmission; and
   assigning, by a processor, a starting sequence number for the new bearer transmission in accordance with the last used sequence number for the previous bearer transmission.

18. The method of claim 17, further comprising replacing, in the memory, the last used sequence number with the new sequence number.

19. The method of claim 17, further comprising transmitting the starting sequence number.

* * * * *